US007581572B1

(12) United States Patent
Sutera et al.

(10) Patent No.: US 7,581,572 B1
(45) Date of Patent: Sep. 1, 2009

(54) FUEL SAVING VALVE ASSEMBLY

(75) Inventors: Janet M. Sutera, 601 Stonehedge Dr., Vestal, NY (US) 13850; Kenneth A. Lyman, Endicott, NY (US); Steven Palmatier, Norwich, NY (US)

(73) Assignee: Janet M. Sutera, Shawnee, KS (US)

( * ) Notice: Subject to any disclaimer, the term of this patent is extended or adjusted under 35 U.S.C. 154(b) by 259 days.

(21) Appl. No.: 11/190,670

(22) Filed: Jul. 26, 2005

Related U.S. Application Data

(63) Continuation-in-part of application No. 10/307,576, filed on Dec. 2, 2002, now Pat. No. 7,228,870.

(51) Int. Cl.
*B65B 3/04* (2006.01)
*F16K 23/00* (2006.01)

(52) U.S. Cl. .................. 141/311 A; 141/192; 141/392; 137/527.6; 137/540; 222/108; 222/549; 222/571; 251/286; 251/313

(58) Field of Classification Search ................ 141/392, 141/192, 311 A; 137/540, 511, 527.6, 527; 251/180, 192, 286, 287, 313, 56, 59, 60; 222/519, 520, 548, 549, 553, 554, 571, 108
See application file for complete search history.

(56) References Cited

U.S. PATENT DOCUMENTS 4,213,488 A * 7/1980 Pyle ............................ 141/1
4,440,382 A * 4/1984 Pruvot et al. ............... 251/248
5,377,729 A * 1/1995 Reep ......................... 141/392
5,620,032 A * 4/1997 Dame ..................... 141/311 A
5,645,116 A * 7/1997 McDonald ................. 141/208
5,664,939 A * 9/1997 Giordani et al. ............ 417/369
6,622,795 B2 * 9/2003 Hebert et al. ........... 137/515.7

* cited by examiner

*Primary Examiner*—Timothy L Maust
*Assistant Examiner*—Nicolas A Arnett
(74) *Attorney, Agent, or Firm*—Hinman, Howard & Kattell; Mark Levy

(57) ABSTRACT

A valve assembly disposed in a nozzle of a fuel-dispensing pump that, when in an open, operative position, freely allows fuel to flow therethrough. In a closed position, fuel is prevented from dripping from the end of the fuel-dispensing nozzle. A first embodiment provides a spherical or flat, spring-loaded one-way sealing element or check valve that is forced away from the dispensing end of the nozzle to allow fuel to flow therefrom. When fuel dispensing is complete, the check valve seals the nozzle. In a second embodiment, apertures in a cap are rotated between an open and a closed orientation to allow or block fuel passage depending upon their angular position. The valve assembly is press fitted into a conventional fuel-dispensing nozzle.

6 Claims, 11 Drawing Sheets

FUEL SAVING VALVE ASSEMBLY

RELATED APPLICATIONS

The present invention is a Continuation-in-Part of U.S. patent application Ser. No. 10/307,576 filed Dec. 2, 2002 now U.S. Pat. No. 7,228,870.

FIELD OF THE INVENTION

The present invention relates to valves for preventing fluid loss and, more particularly, to valves used to prevent gasoline loss from nozzles of gasoline dispensing pumps.

BACKGROUND OF THE INVENTION

In the United States, well over 100 million automobiles and 50 million trucks are in use. Moreover, millions of motorboats are used at least seasonally every year. The result is a large number of vehicles that must be filled with liquid fuel, such as gasoline, oil, or a mixture of both. In the process of filling these vehicles, a small amount of gasoline is inevitably released even after the pump has been shut off. The result is a small degree of spillage of the gasoline on the ground, in the water, or onto the exterior of the vehicle. Multiply this small amount of gasoline loss for each car and truck and boat by the total number of individuals experiencing this spillage and we have an unbelievably large amount of gasoline being lost. This gasoline spillage is damaging to the environment. Both the liquid and the gasoline fumes are potentially hazardous to the environment. Moreover, such spillage of fuel is wasteful of our natural resources.

Although there exist several varieties of one-way valves for liquids, none of these specifically addresses the need to prevent gasoline leakage from common, everyday gasoline pumps.

None of the previously produced one-way valves addresses the specific problem of leakage from a conventional gasoline-dispensing pump. These previously produced one-way valves do not have dimensions that allow them to be used, without equipment modification, with a standard gasoline pump and automobile filling pipes.

It is an object of the invention to provide a one-way gas valve that allows gasoline to pass through it only when the gasoline pump is in operation.

It is a further object of the invention to provide easy adaptation within conventional gasoline dispensing pump nozzle assemblies.

SUMMARY OF THE INVENTION

In accordance with the present invention, there is provided a valve assembly for preventing dripping from the nozzle of a fuel-dispensing pump upon completion of the filling operation. A check or one-way valve is actuated by the pressure of the fuel in the fuel dispensing nozzle and open to allow fuel passage therethrough. Upon completion of the fueling, the check valve again closes. The valve assembly is typically press fit or otherwise retained within the nozzle of a conventional fuel-dispensing nozzle so may be readily provided as an add-on attachment. In alternate embodiments, the valve assembly may optionally be provided with external threads configured to mate with internal threads within the dispensing nozzle. The mechanisms of the various embodiments of the inventive valve assembly may also be integrally incorporated into the fuel-dispensing nozzle itself. Four different embodiments of the novel valve assembly are described. A first utilizes a spherical structure to seal the end of the nozzle. A second embodiment uses a flat end cap that is extended forward of the discharge end of the nozzle by fuel pressure. Third and fourth embodiments utilize a valve end cap having orifices that are aligned with matching orifices in the valve body by rotation of the valve cap in a plane substantially perpendicular to the major axis of the valve assembly.

BRIEF DESCRIPTION OF THE DRAWINGS

A complete understanding of the present invention may be obtained by reference to the accompanying drawings, when considered in conjunction with the subsequent, detailed description, in which.

DESCRIPTION OF THE PREFERRED EMBODIMENT

Figure 1:
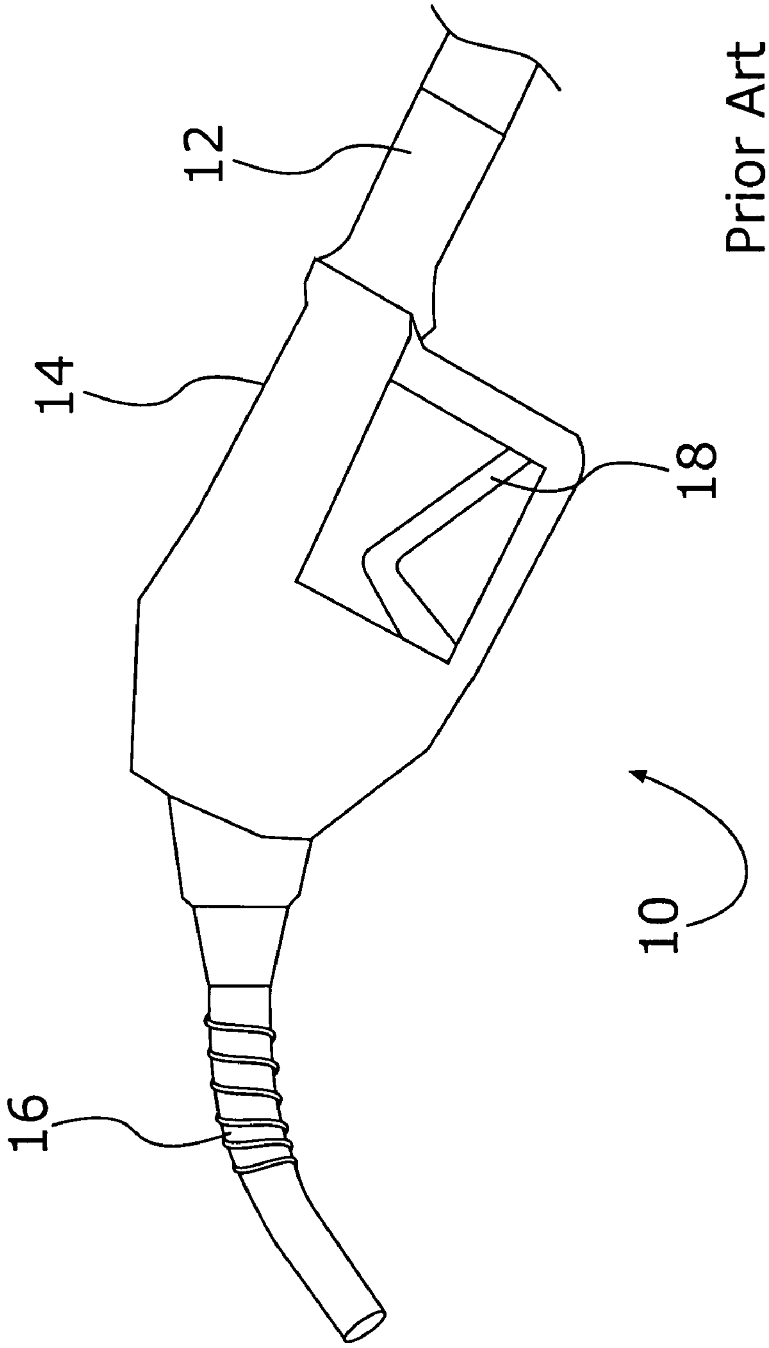
Prior Art Figure 1
FIG. 1 is a perspective view of a conventional gas dispensing pump nozzle assembly of the prior art.

The present invention is a gas saving device hereinafter referred to as the trademark GASaver. The GASaver device of the present invention is adapted and configured for cooperative use with a conventional gas dispensing pump nozzle assembly (i.e., handle) 10 (FIG. 1). Several embodiments of GASaver devices are described hereinbelow. While each embodiment is presented as an add-on assembly for an existing gas dispensing pump nozzle, it will be recognized that each embodiment of the GASaver mechanism may be incorporated as an integral part of a gas dispensing pump nozzle. Consequently, the invention covers each GASaver mechanism, whether provided as an add-on attachment or integrally incorporated in a gas pump nozzle.

FIG. 1 is a perspective view of a conventional gas dispensing pump nozzle assembly 10 of the prior art. A hose 12 is connected to the assembly 10 in a manner well known to those skilled in the art. The body 14 of nozzle assembly 10 has a spout or nozzle 16 extending away therefrom. The nozzle 16 is adapted to be inserted into the filler tube, not shown, of a gas tank of a motor vehicle, not shown, or other such fuel-receiving orifice. Liquid fuel, not shown, is caused to flow from hose 12 through body 14 and through nozzle 16 by means of a flow operating lever 18, which opens a valve, not shown, in the handle of gas dispensing pump nozzle 16 assembly.

Referring now to FIGS. 2 through 6, there are shown side elevational, partial rear perspective, bottom view showing the valve ball in its closed position, bottom view with the ball valve in an open position, and in-situ views, respectively of a first embodiment of GASaver device 20 in accordance with the invention. Outer tube 22 is formed from metal, plastic, rubber, or any other suitable material, typically having a relative high durometer. A connector portion 24 is disposed proximate a distal end of outer tube 22.

A valve ball 26, discussed in greater detail hereinbelow, is disposed at a proximal end of outer tubing 22. The connector 24 is adapted to be press fit into the distal end of dispensing pump nozzle assembly 10 (FIG. 1). In alternate embodiments, optional external threads on GASaver may be provided for threaded interaction with mating threads on an inner wall within nozzle 16. The inner diameter of nozzle 16 is approximately 9/16 inches. While this specific dimension describes conventional gas dispensing nozzles commonly in use within the United States, it will be recognized that other standard dimensions may exist and the invention is not limited to the specific example chosen for purposes of disclosure.

Connector 24 is attached to, or may be part of, outer tubing 22 by welding, mechanically fastening, adhesive bonding, or any other suitable manner known to those skilled in the art. The outside diameter of outer tubing 22 is approximately equal to the inside diameter of gas dispensing pump nozzle 16 assembly to permit the GASaver device 20 to be fit into the automobile gasoline tank filler tube, not shown.

At the proximal end of GASaver device 20, valve ball 26 is attached to a proximal end of metal coil spring 30 by welding or mechanically fastening in a manner well known to those skilled in the art. It should be understood, however, that spring 30 need not be a coil spring 30, but must provide resiliency to valve ball 26. Moreover, spring 30 need not be metallic. The spring 30 is also attached to a crossbar 28 (FIG. 3) by welding or mechanically fastening in a manner well known to those skilled in the art. The spring 30 is of a tension that allows valve ball 26 to from the opening of nozzle 16 when pressure of the fuel is applied thereto.

Figures 2, 3:
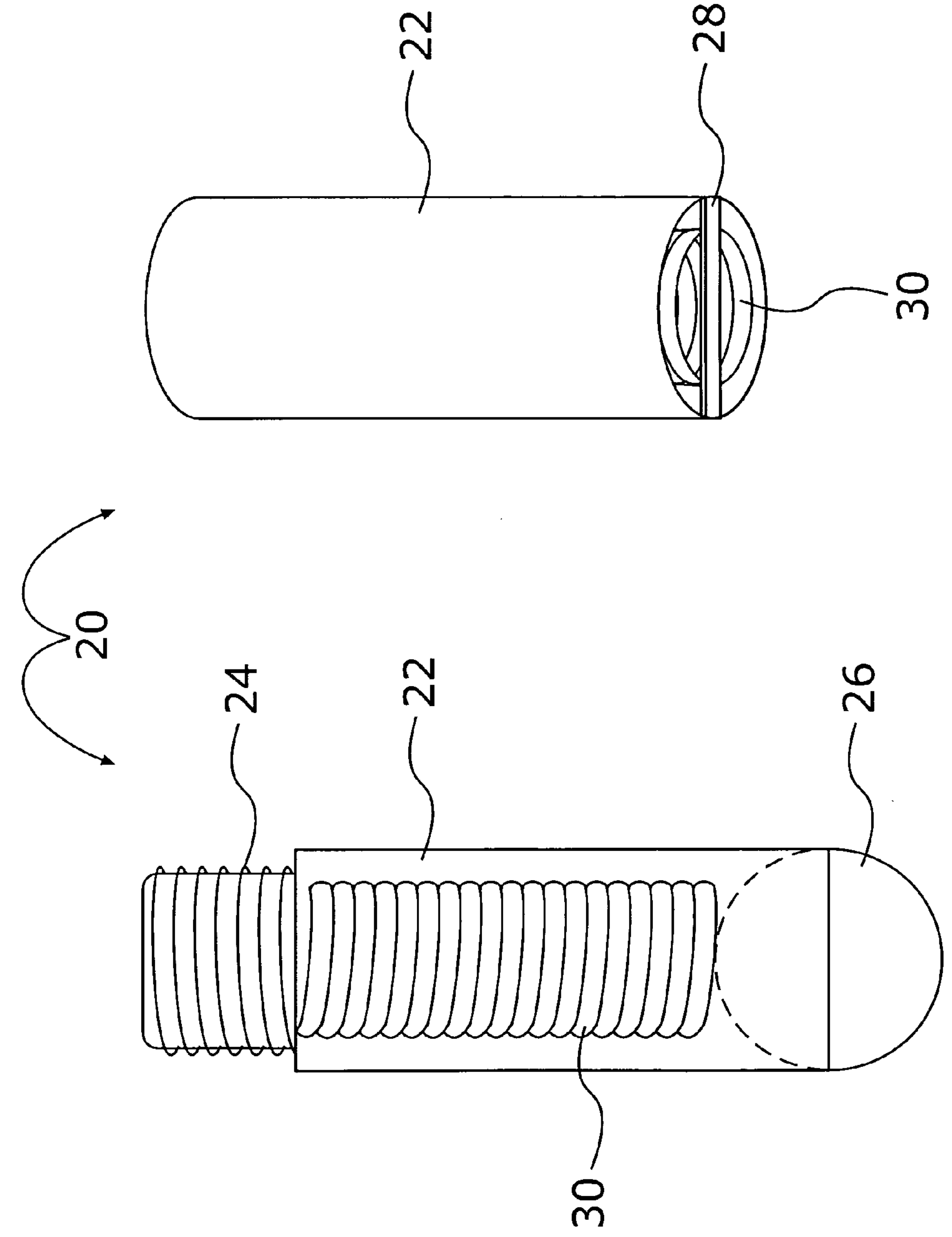
FIG. 2 is a side elevational view of a first embodiment of a GASaver™ device of the present invention.
FIG. 3 is a rear perspective view of the GASaver device of FIG. 2.

Permanently connected to the distal end of outer tubing 22 is crossbar 28 (FIG. 3), as mentioned hereinabove. The spring 30 is seated relative to GASaver device 20 by means of anchoring to crossbar 28. The crossbar 28 is preferably fabricated from metal or other suitable material. With a tension spring 30 (FIG. 3) cross bar 28 is required but using a compression spring 112 (FIG. 7*a*) no crossbar is needed. A compression spring may also be used in a fashion similar to that shown in FIG. 7*a* if valve cap 120 functions as valve ball 26 (FIG. 2). However, in the event compression spring 112 is used, shoulder screw 110, threads 118 and central opening 108, as hereinbelow described, would be required.

FIG. 3 is an enlarged, top perspective view of the GASaver device 20. A crossbar 28 is affixed to the sides of tube 22 and has openings on either side to allow free fuel flow therearound and through outer tubing 22. A proximal end of spring 30 is attached to crossbar 28.

Figures 4, 5:
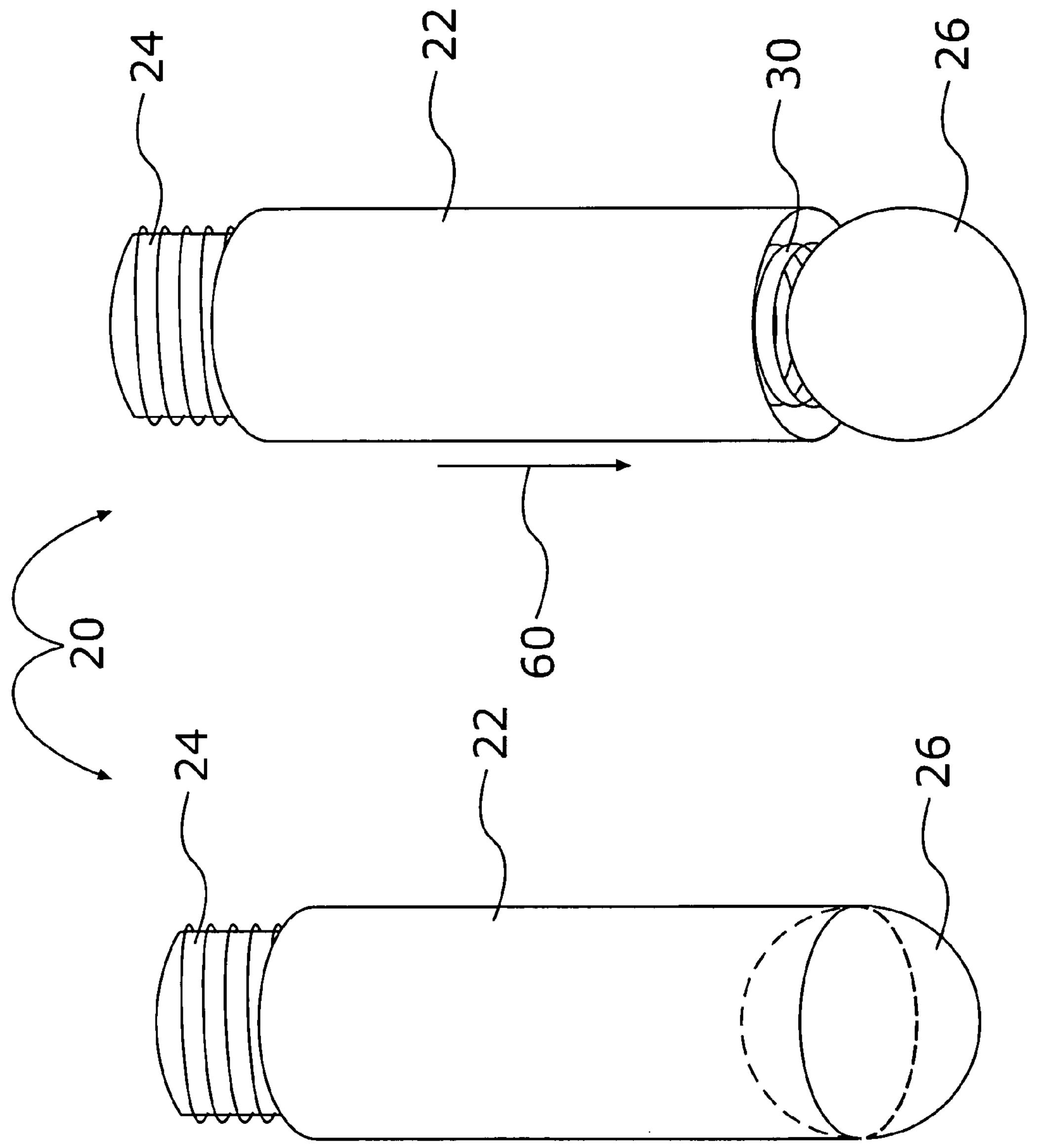
FIG. 4 is a bottom view of a GASaver device showing the valve ball in its closed position.
FIG. 5 is a bottom view of a GASaver device with the ball valve shown in its open position.

FIG. 4 is an enlarged, bottom perspective view of GASaver device 20 with spring 30 compressed and valve ball 26 in the closed, seated position, as also shown in FIG. 2. This is the quiescent condition, when fuel is not allowed to flow through nozzle 16, due to flow operating lever 18 being deactivated. In this position, valve ball 26 forms a substantially tight seal with the proximal end of outer tubing 22, thus preventing fuel from leaking therefrom.

FIG. 5 is an enlarged, bottom perspective view of GASaver device 20, with spring 30 expanded and valve ball 26 in the open position. This is the active condition, when fuel is permitted to flow through nozzle 16, due to flow operating lever 18 being activated (i.e., retracted). In this position, valve ball 26 is forced to move in the direction of the fuel flow, arrow 60, stretching spring 30 and moving away from the proximal end of outer tubing 22, thus allowing fuel to flow freely into the filler tube of the vehicle.

Figure 7A:
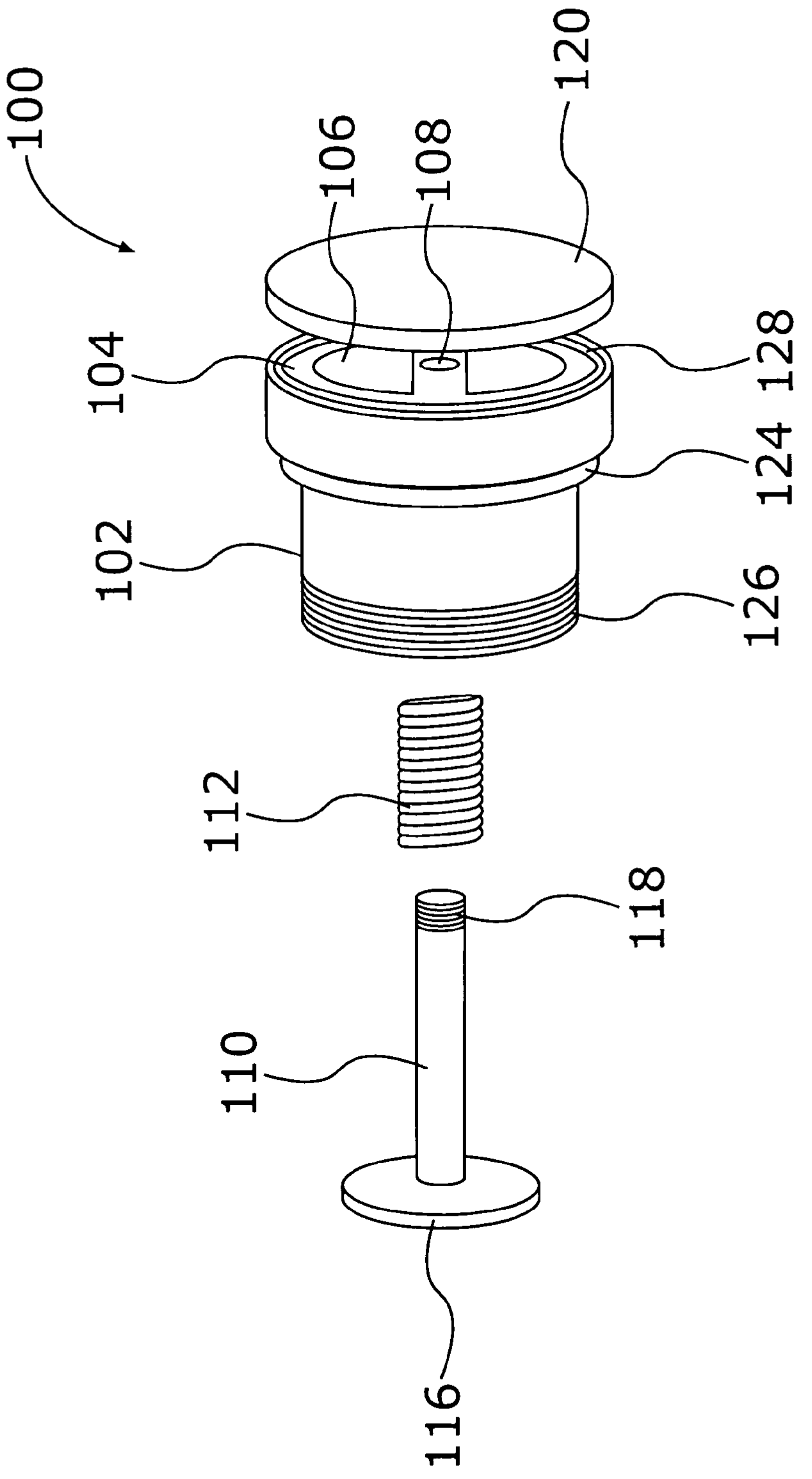
FIGS. 7*a* and 7*b* are exploded, perspective and side, cross-sectional views, respectively, of a first, alternate embodiment of a GASaver device.
Figure 7B:
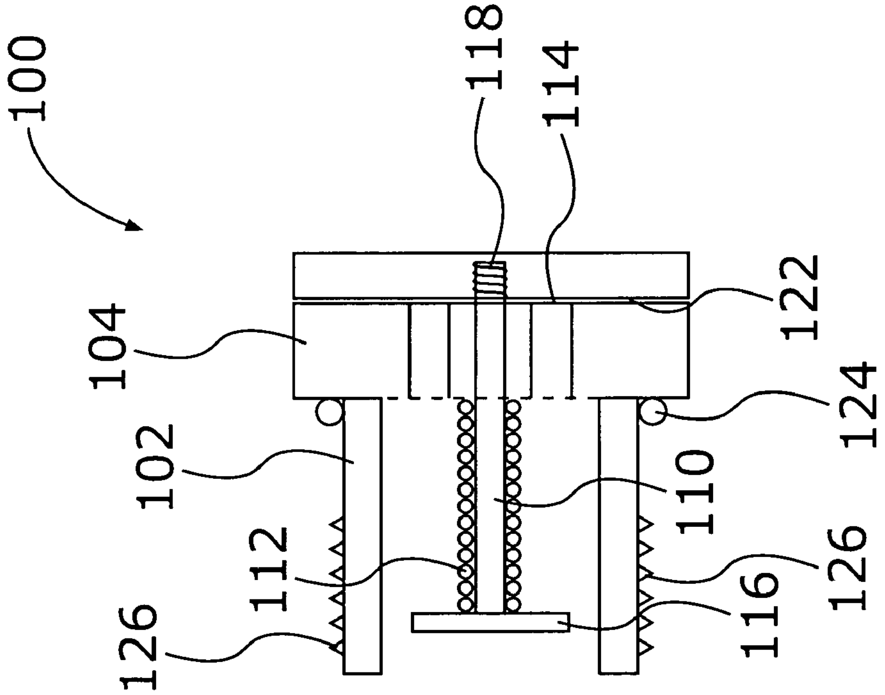

Referring now to FIGS. 7*a* and 7*b*, there are shown perspective exploded and side, cross-sectional views, respectively, of a first alternate embodiment of a GASaver device 100 of the present invention. A valve body 102 has a proximal end 104 having a plurality of orifices 106 therethrough. The number and configuration of orifices 106 is unimportant as long as sufficient fuel is allowed to flow therethrough during normal operation. A central opening 108 is also provided in proximal end 104 to slidably accommodate the shaft of shoulder screw 110. A coil spring 112 is disposed inside valve body 102 with a proximal end resting against an inner surface 114 of proximal end 104 of valve body 102. A distal end of coil spring 112 is retained by an inner surface of head 116 of shoulder screw 110 at a distal end thereof.

The proximal end of shoulder screw 110 is typically equipped with external threads 118. A valve cap 120 has an inner surface 122 adapted and configured to seat against proximal end 104 of valve body 102. Valve cap 120 has a tapped, central opening adapted to receive threads 118 of fastener or shoulder screw 110. It will be recognized that alternate methods of fastening shoulder screw to valve cap 120 exist. For example, shoulder screw 110 may be swedged, cemented, or otherwise attached to valve cap 120. The invention, therefore, covers any and all possible methods and mechanisms for attaching shoulder screw 110 to valve cap 120.

Sealing between valve cap 120 and proximal end 104 may be accomplished in at least two ways. First, the inside surface of valve cap 120 and proximal end 104 of valve body may be precision finished so that a liquid light seal is formed between them when they are in a close, mated position. One possible way to accomplishing the required degree of precision finishing is to hard anodize the two surfaces (assuming that valve body 102 and valve cap 120 are formed from aluminum) and then precision grinding both surfaces to the required finish. It will be recognized by those skilled in the art than many other materials and methods of providing the necessary degree of finish are available. Consequently, the invention is not limited to the method chosen for purposes of disclosure but covers any suitable material and/or finishing method.

Sealing may also be accomplished by placing a compliant perimeter seal 128 between proximal end 104 and the inside surface of valve cover 120. The seal 128 may take the form of an O-ring formed from a suitable fuel-resisting material inset into a groove in proximal end 104. In alternate embodiments, compliant seal 128 could be attached to the inside surface of valve cover 120. Seal cross-sections other than circular (i.e., an O-ring) may also be used. Compliant seal 128 could be attached to either or both proximal end 104 and the inside surface of valve cover 120. Compliant seal 128 could also be adhesively bonded to one or both of the aforementioned surfaces.

Valve body 102 is typically press fitted or bonded such as by epoxy, into the distal end of nozzle 16. Alternately, valve body 102 may have external threads 126, formed along a portion thereof proximate its distal end. Threads 126 can be adapted and configured for engaging interaction with internal threads, not shown, in the nozzle 16 (FIG. 1) of dispensing pump nozzle handle assembly 10.

Figure 6:
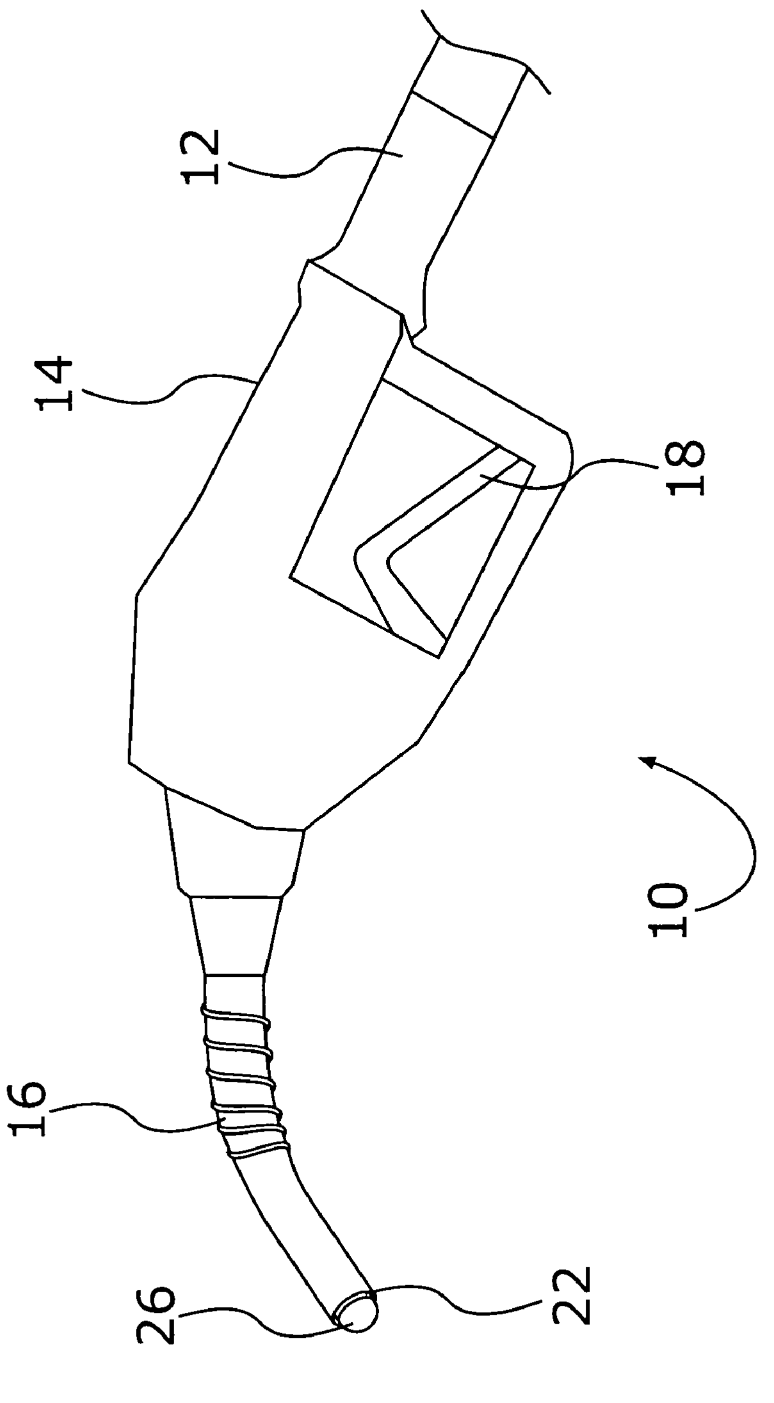
FIG. 6 is a perspective view of a gas dispensing pump nozzle assembly having the GASaver device of FIG. 1 installed therein.

GASaver 100 is adapted for insertion into a fuel-dispensing nozzle 10 (FIG. 6) in a manner identical to that of the embodiment of the GASaver device described hereinabove. An optional O-ring 124 may be placed around valve body 102. O-ring 124, when used, helps provide sealing between GASaver 100 and the distal end of nozzle 16 (FIG. 6)

In operation, GASaver 100 is in a quiescent state with valve cap 120 seated against proximal end 104 of valve body 102 to provide a liquid seal thereat. Valve cap 120 is held seated against proximal end 104 by coil spring 112 exerting pressure against head 116 of shoulder screw 110. When fuel flows through nozzle 10, pressure is exerted against the inside surface of valve cap 120 thereby compressing coil spring 112 and moving valve cap 120 with attached shoulder screw 110 outwardly away from distal end 104 of valve body 102 allowing fuel to flow through the plurality of orifices 106 and around the end of valve cap 120. When fuel stops flowing, coil spring 112 again elongates to its original position thereby providing a restorative force that pulls valve cap 120 tightly against proximal end 104 of valve body 102 thus preventing dripping of excess fuel therefrom.

Figure 8A:
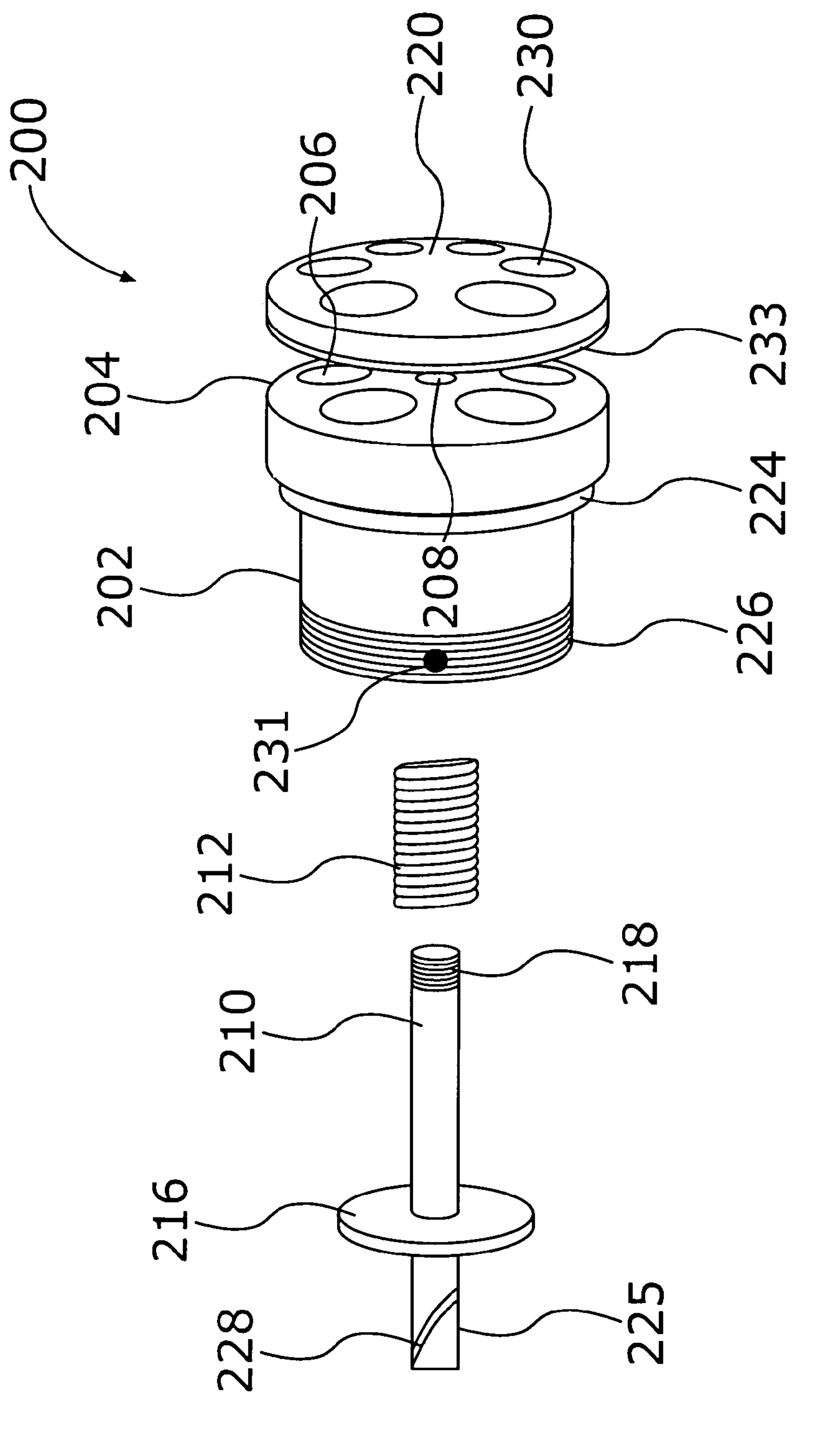
FIGS. 8*a* and 8*b* are exploded, perspective and side, cross-sectional views, respectively, of a second, alternate embodiment of a GASaver device.
Figure 8B:
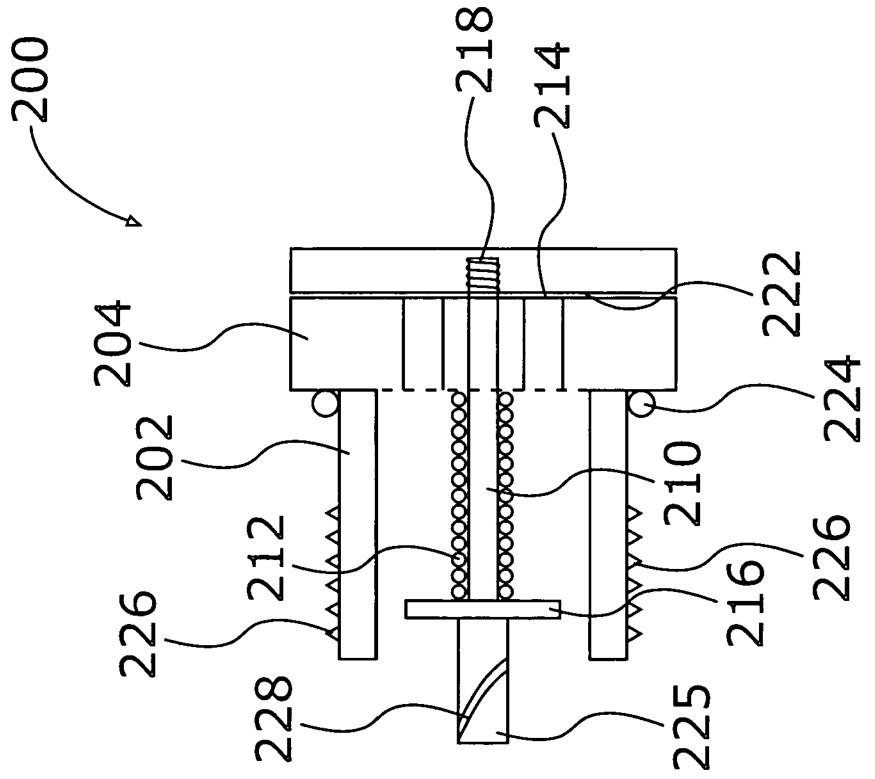

Referring now to FIGS. 8*a* and 8*b*, there are shown exploded perspective and side cross-sectional views, respectively, of a third embodiment of a GASaver device, generally at reference number 200. A valve body 202 has a proximal end 204 having a plurality of orifices 206 therethrough. Orifices 206 are disposed in a pattern adapted to interact with a similar but offset pattern of orifices 230 disposed in valve front plate 220 as is described in detail hereinbelow. Orifices 206 and 230 are sized and configured to allow sufficient fuel flow when in an aligned angular relationship to one another.

A central opening 208 is also provided in proximal end 204 of valve body 202 to slidably accommodate the shaft of shoulder screw 210. A coil spring 212 is disposed inside valve body 202 with a proximal end resting against an inner surface 214 of proximal end 204 of valve body 202. A distal end of coil spring 212 is retained by an inner surface of an intermediate head 216 of shoulder screw 210.

The proximal end of shoulder screw 210 is typically equipped with external threads 218. An extended portion 225 of shoulder screw 210 has a substantially spiral groove 228 formed therein. Groove 228 is adapted to receive the distal end of a pin 231 disposed in valve body 202 and extending substantially perpendicularly to valve body 202.

A valve cap 220 has an inner surface 222 adapted and configured to rotatively interact with proximal end 204 of valve body 202. Valve cap 220 has a central opening, not shown, disposed on an inner surface thereof, and adapted to receive the end of fastener or optional threads 218 of shoulder screw 210. It will be recognized that alternate methods of fastening shoulder screw 210 to valve cap 220 exist. For example, shoulder screw 210 may be swedged, cemented, or otherwise attached to valve cap 220. The invention, therefore, covers any and all possible methods and mechanisms for attaching shoulder screw 210 to valve cap 220.

As discussed hereinabove, sealing between proximal surface 204 of valve body 202 and valve cap 220 may be provided by either controlling the degree of finish on the mating surfaces or by providing a compliant seal 233 therebetween. In an alternate embodiment, individual circumferential seals, not shown, could be placed around each orifice 230.

Valve body 202 is press fitted or bonded within nozzle 16 (FIG. 1) of dispensing pump nozzle handle assembly 10 (FIG. 1). Threads 226 may also be provided.

GASaver 200 is adapted for insertion into fuel-dispensing nozzle 10 (FIG. 6) in a manner identical to that of the embodiment of the GASaver device described hereinabove. An optional O-ring 224 may be placed around valve body 202. O-ring 224, when used, helps provide sealing between GASaver 200 and the distal end of nozzle 16 (FIG. 6)

In operation, GASaver 200 is in a quiescent state with valve cap 220 seated against and in an angular relationship proximal end 204 of valve body 202 such that orifices 206 and 230 are completely misaligned to provide a liquid seal thereat. In other words, no fuel may flow from an interior region of body 202 through orifices 206 and 230. The end of fuel nozzle 16 (FIG. 6) is sealed by GASaver 200.

Valve cap 220 is held seated against and in a desired, misaligned angular relationship to proximal end 204 by coil spring 212 exerting pressure against intermediate head 216 of shoulder screw 210. When fuel flows through nozzle 10, pressure is exerted against the inside surface of valve cap 220 thereby compressing coil spring 212. Valve cap 220 is initially moved outwardly as fuel begins flowing through valve body 202. However, as valve cap 220 moves outwardly, it also rotates as pin 231 traverses helical groove 228. Rotation continues until pin 230 reaches an end, not shown, of helical groove 228, which acts as a limit stop. Consequently, shoulder screw 210 is free to rotate only a predetermined angular distance, the predetermined angular distance being established to allow orifices 206 and 230 to move from fully aligned to fully misaligned relationships to one another. Valve cap 204 is rotated to a fully aligned angular relationship, such that orifices 206 and 230 are substantially aligned in a configuration allowing fuel to flow freely through orifices 230 therein.

When fuel stops flowing, coil spring 212 again extends to its original position thereby providing a restorative force that restores valve cap 220 to a non-aligned angular relationship with proximal end 204 of valve body 202 thereby preventing dripping of excess fuel therefrom.

For purposes of disclosure, a helical groove 228 is shown disposed in shoulder screw 210 while pin 231 is rigidly affixed to valve body 202. It will be recognized that the locations of pin 231 and groove 228 may readily be interchanged, groove 228 being disposed along an inside surface of valve body 202 and pin 231 being affixed to shoulder screw 210 in an appropriate manner. In still other embodiments, it will be recognized that a pin and complementary groove arrangement, not shown, could be disposed in proximal surface 204 of valve body 202 and valve cap 220 to provide a similar angular motion-limiting arrangement. Consequently, the invention is not considered limited to the particular arrangement chosen for purposes of disclosure. Rather, the invention covers any and all possible placements of a pin and groove that interactively provide the limit stop function of the disclosed embodiment.

Figure 9A:
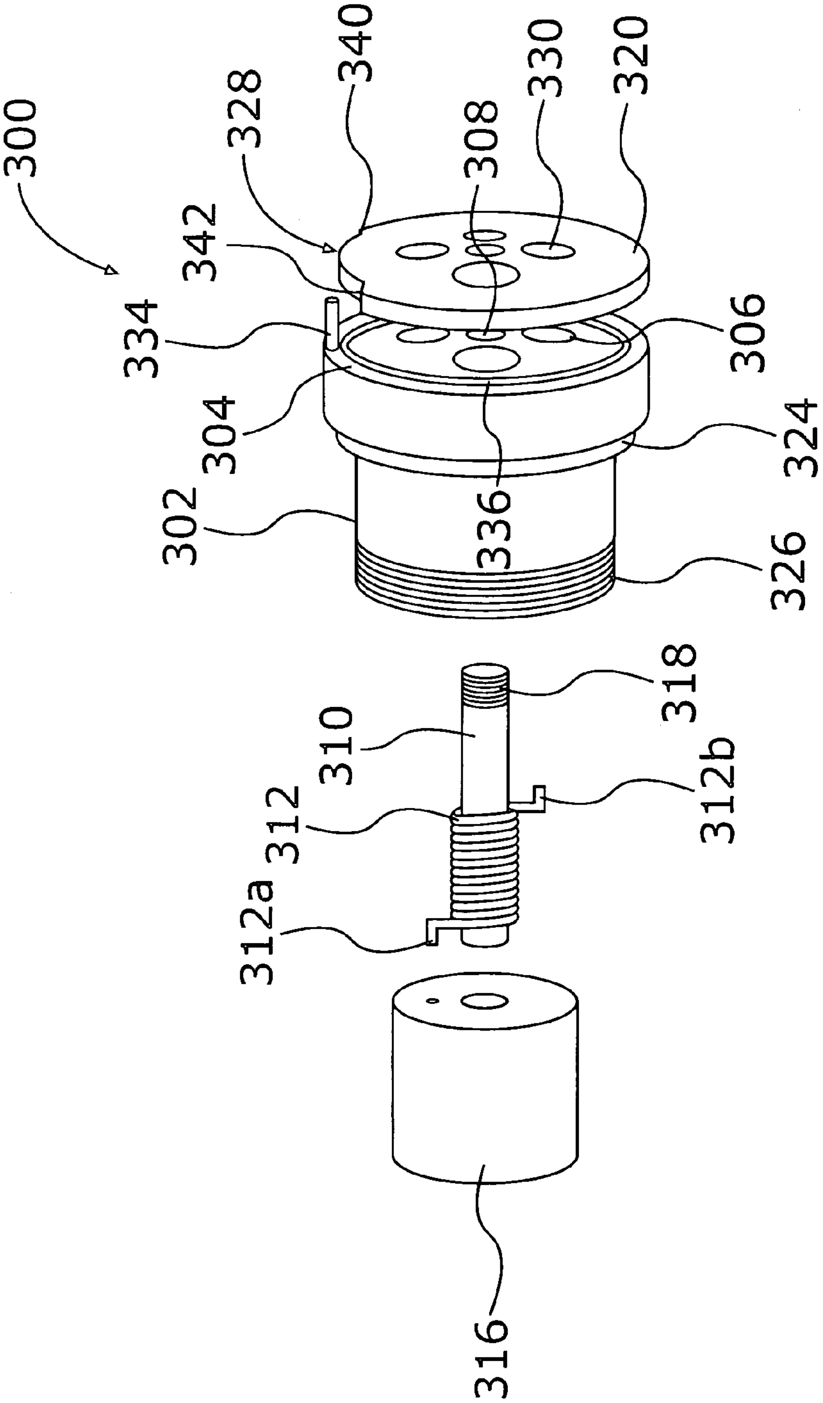
FIGS. 9*a* and 9*b* are exploded, perspective and side, cross-sectional views, respectively, of a third, alternate embodiment of a GASaver device.
Figure 9B:
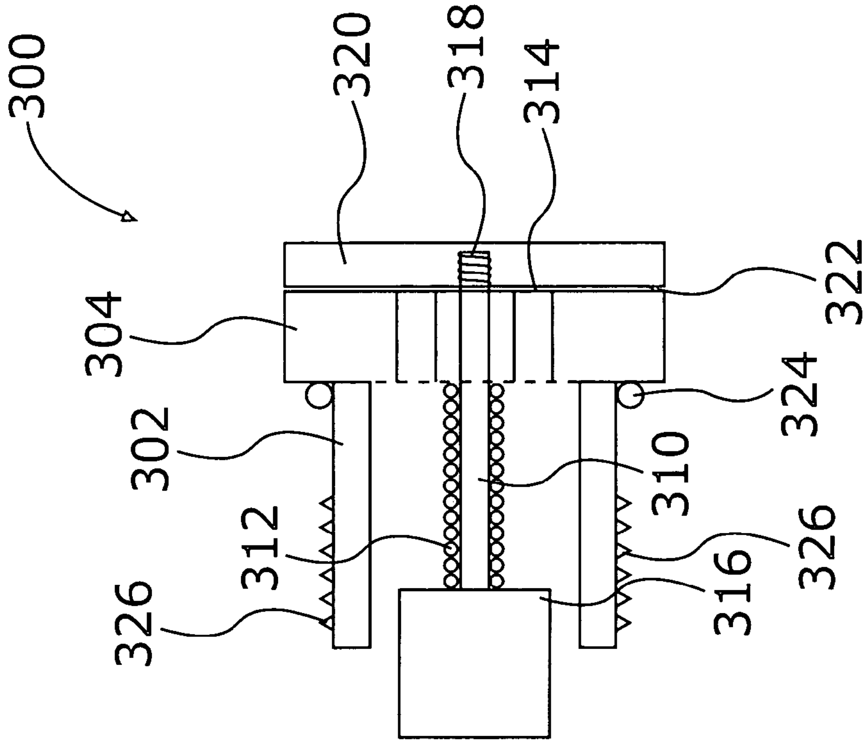
Figure 9C:
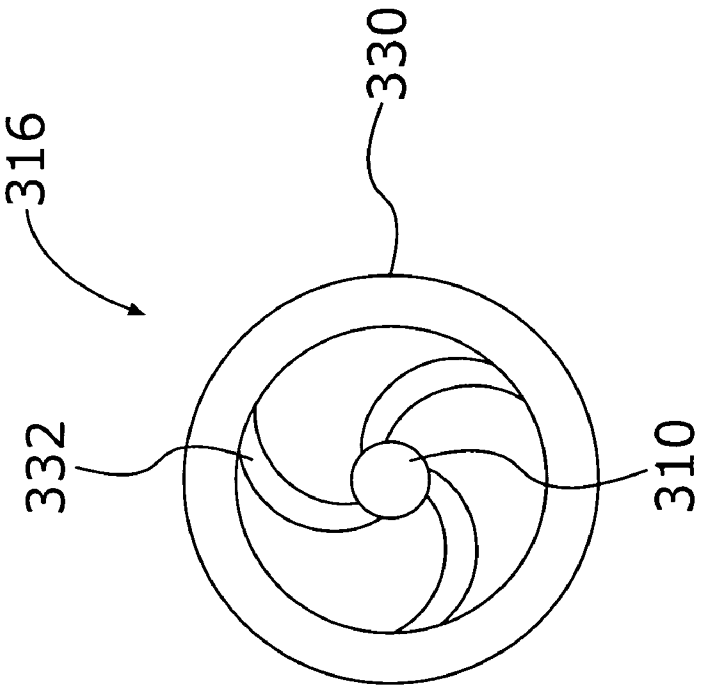
FIG. 9*c* is a rear, elevational view of an impeller portion of the GASaver device of FIGS. 9*a* and 9*b*.

Referring now to FIGS. 9*a*-9*c*, there are shown exploded perspective, side cross-sectional, and end elevational views, respectively of a fourth embodiment of a GASaver 300. GASaver 300 operates in a manner similar to GASaver 200 described in detail hereinabove. That is, fuel flow through the valve is controlled by the selective alignment and non-alignment of orifices in the discharge portion of GASaver 300.

A valve body 302 has a proximal end 304 having a plurality of orifices 306 therethrough. Orifices 306 are disposed in a pattern adapted to interact with a similar but offset pattern of orifices 330 disposed in valve front plate 320 as is described in detail hereinbelow. Orifices 306 and 330 are sized and configured to allow sufficient fuel flow when in an aligned angular relationship to one another.

A central opening 308 is also provided in proximal end 304 of valve body 302 to slidably accommodate shaft 310. As in other GASaver embodiments 100 and 200 (FIGS. 7*a* and 8*a*, respectively), shaft 310 may have threads 318 disposed on a proximal end thereof.

Valve cap 320 has a cutaway portion 328 formed in the face thereof, the ends 340, 342 forming limit stops. A pin 334 disposed in the proximal end 304 of valve body 302 is adapted and configured to interact with cutaway portion 328. As valve cap 320 rotates in the manner described hereinbelow, ends 340, 342 determine the extent of rotation thereof and allow the angular relationship of valve cover 320 and the proximal end 304 of valve body 302 to be precisely controlled between fully aligned and fully non-aligned angular relationships. It will be recognized that the locations of pin 334 and cutaway portion 328 could be reversed and the rotation limiting function would still be provided. In still other alternate embodiments, a pin and groove arranges similar to groove 228 and pin 231 (FIG. 8*a*) could be used to provide rotation limits. Consequently, the invention is not considered limited to the rotation limiting arrangement chosen for purposes of disclosure.

An impeller assembly 316 is disposed at a proximal end of shaft 310 and is rigidly affixed thereto using any suitable fastening means. FIG. 9*c* provides a rear elevational view of impeller 316. Am impeller blade 332 is affixed to the distal end of shaft 310 within impeller housing 330. Impeller assembly blade 332 may be attached to shaft 310 by threads, a swedged attachment, adhesive, or by any other suitable means known to persons of skill in the art. Impeller housing 330 is anchored to valve housing 302, which prevents the rotation of impeller housing 330 relative thereto. The fastening of impeller housing 330 to valve housing 302 is not specifically shown and may be accomplished in any suitable manner known to those of skill in the art.

A torsion spring 312 is disposed around shaft 310 adjacent impeller assembly 316. A distal end 312A of torsion spring 312 is affixed to impeller 316. A proximal end 312B of torsion spring 312 is affixed to valve body 302. Torsion spring 312, in addition to providing restorational torque, provides a reward force on impeller 316, thereby keeping valve cap 320 secured against proximal end 304 of valve body 302.

A valve cap 320 has an inner surface 322 adapted and configured to rotatively interact with proximal end 304 of valve body 302. Valve cap 320 has a tapped, central opening, not shown, disposed on an inner surface thereof, and adapted to receive threads 318 of shaft 310. It will be recognized that alternate methods of fastening shaft 310 to valve cap 320 exist. For example, shaft 310 may be swedged, cemented, or otherwise attached to valve cap 320. The invention, therefore, covers any and all possible methods and mechanisms for attaching shaft 310 to valve cap 320.

As discussed hereinabove, a liquid-tight seal is provided between proximal end 304 and an inside surface of valve cap 320.

Valve body 302 is typically press fitted or bonded into a distal end of nozzle 16 (FIG. 1). In alternate embodiments, external threads 326 formed along a portion of valve body 304 proximate the distal end thereof may be provided. Threads 326 are sized and configured for interactive engagement with internal threads, not shown, within nozzle 16 (FIG. 1) of dispensing pump nozzle handle assembly 10 (FIG. 1).

GASaver 300 is adapted for insertion into a fuel-dispensing nozzle 10 (FIG. 6) in a manner identical to that of the embodiment of the GASaver device described hereinabove. An optional O-ring 324 may be placed around valve body 302. O-ring 324, when used, helps provide sealing between GASaver 300 and the distal end of nozzle 16.

In operation, GASaver 300 is in a quiescent state with valve cap 320 seated against and in an angular relationship to proximal end 304 of valve body 302 such that orifices 306 and 330 are completely misaligned to provide a liquid seal thereat. In other words, no fuel may flow from an inner region of body 302 through orifices 306 and 330. The end of fuel nozzle 16 is sealed by GASaver 300.

Valve cap 320 is held seated against and in a desired, misaligned angular relationship to proximal end 304 by torsion spring 312 providing torque to shaft 310. When fuel flows through nozzle 10, pressure is exerted against impeller blade 332, which in turn rotates shaft 310. Valve cap 320 rotates. As impeller blade 332 and shaft 310 rotate, cutaway portion of valve cap 320 passes pin 334 until a respective limit stop 340, 342 is reached. Consequently, shaft 310 is free to rotate only a predetermined angular distance, the predetermined angular distance being established to allow orifices 306 and 330 to move from fully aligned to fully misaligned relationship to one another. Valve cap 304 is rotated to a fully aligned angular relationship and fuel flows freely through orifices 330 therein. As shown in FIGS. 9*a* and 9*b*, orifices 306 and 330 are substantially aligned in a configuration allowing fuel, not shown, to flown freely therethrough.

When fuel stops flowing, torsion spring 312 supplies restorative torque so that valve cap 320 is returned to a fully non-aligned angular relationship with proximal end 304 of valve body 302, thereby preventing dripping of excess fuel therefrom.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A shut-off valve for use with a liquid dispensing system, comprising:

a) a valve body having a distal face, a proximal surface and a periphery, at least a portion of said periphery being dimensioned to fit snuggly within a liquid delivery nozzle, said valve body comprising at least one unimpeded orifice extending from said distal face to said proximal surface thereof and comprising stopping means attached thereto;

b) a cap disposed proximate said distal face of said valve body, said cap having at least one unimpeded orifice formed therethrough, said cap being rotatable between a first, closed orientation and a second, open orientation; and c) means for rotating said cap, said means being spaced apart therefrom, and said cap rotating from said first, closed orientation to said second, open orientation and responsive to a flow of liquid in said liquid delivery nozzle; and d) biasing means operatively connected to said cap;

whereby when said cap is disposed at said first, closed orientation, liquid flow from said at least one unimpeded orifice in said valve body is blocked through the use of said biasing means and when said cap is disposed at said second, open orientation, said at least one unimpeded orifice in said cap is aligned with said at least one unimpeded orifice in said valve body thereby allowing liquid to be discharged from said liquid delivery nozzle.

2. The shut-off valve for use with a liquid dispensing system in accordance with claim 1, wherein said at least one orifice in said valve body comprises a plurality of orifices disposed in a first, predetermined pattern and said at least one orifice in said cap comprises a plurality of orifices arranged in a second, predetermined pattern.

3. The shut-off valve for use with a liquid dispensing system in accordance with claim 2, wherein said first predetermined pattern of orifices is blocked by said second predetermined pattern of orifices when said cap is disposed in said first, closed orientation and said first pattern of orifices is unobstructed when said cap is disposed in said second, open orientation.

4. The shut-off valve for use with a liquid dispensing system in accordance with claim 1, wherein said means for rotating said cap comprises an impeller disposed for operative interaction with a liquid in said liquid delivery nozzle.

5. The shut-off valve for use with a liquid dispensing system in accordance with claim 1, further comprising:

e) sealing means disposed between said distal face of said valve body and said cap for providing a liquid tight seal therebetween.

6. The shut-off valve for use with a liquid dispensing system in accordance with claim 1, wherein said valve is housed completely within said delivery nozzle.

* * * * *